United States Patent [19]

Tito

[11] 4,260,128
[45] Apr. 7, 1981

[54] VALVE ACTUATORS AND COMBINED VALVES AND ACTUATORS

[76] Inventor: Kostag V. Tito, 14 Forest St., Saco, Me. 04005

[21] Appl. No.: 67,333

[22] Filed: Aug. 17, 1979

[51] Int. Cl.³ .............................................. F16K 31/22
[52] U.S. Cl. ...................................... 251/58; 74/89.12; 92/133; 92/136; 92/69 R; 92/138; 251/31; 251/229; 251/250; 251/288
[58] Field of Search ...................... 251/14, 58, 31, 229, 251/250, 288; 74/89.11, 89.12; 91/391; 92/63, 130 A, 132, 133, 134, 69 R, 136, 138

[56] References Cited

U.S. PATENT DOCUMENTS

| | | | |
|---|---|---|---|
| 2,588,955 | 3/1952 | Brannen | 92/133 |
| 3,104,862 | 9/1963 | Pearson et al. | 251/58 |
| 3,107,080 | 10/1963 | Priese | 251/58 |
| 3,246,581 | 4/1966 | Carr | 92/136 |
| 3,650,506 | 3/1972 | Bruton | 251/58 |
| 3,970,285 | 7/1976 | Lonn | 251/288 |
| 3,982,725 | 9/1976 | Clark | 251/58 |
| 4,046,350 | 9/1977 | Massey et al. | 251/58 |
| 4,087,074 | 5/1978 | Massey et al. | 251/58 |

Primary Examiner—Martin P. Schwadron
Assistant Examiner—G. L. Walton

[57] ABSTRACT

A valve actuator has at least one piston in a cylindrical chamber that has a segmental skirt provided with transverse teeth on its chordal face meshing with lengthwise teeth on the hub of a rotor extending diametrically through the chamber with one rotor end exposed and provided with a portion for mating engagement with a valve stem portion when the valve is clamped to the actuator. Air is delivered into the chamber on opposite sides of the piston and the skirt is provided with antifriction elements. Single and dual piston embodiments are disclosed as well as the use of springs by which the valve is operated in a wanted manner in the event of loss of piston operating pressures.

5 Claims, 11 Drawing Figures

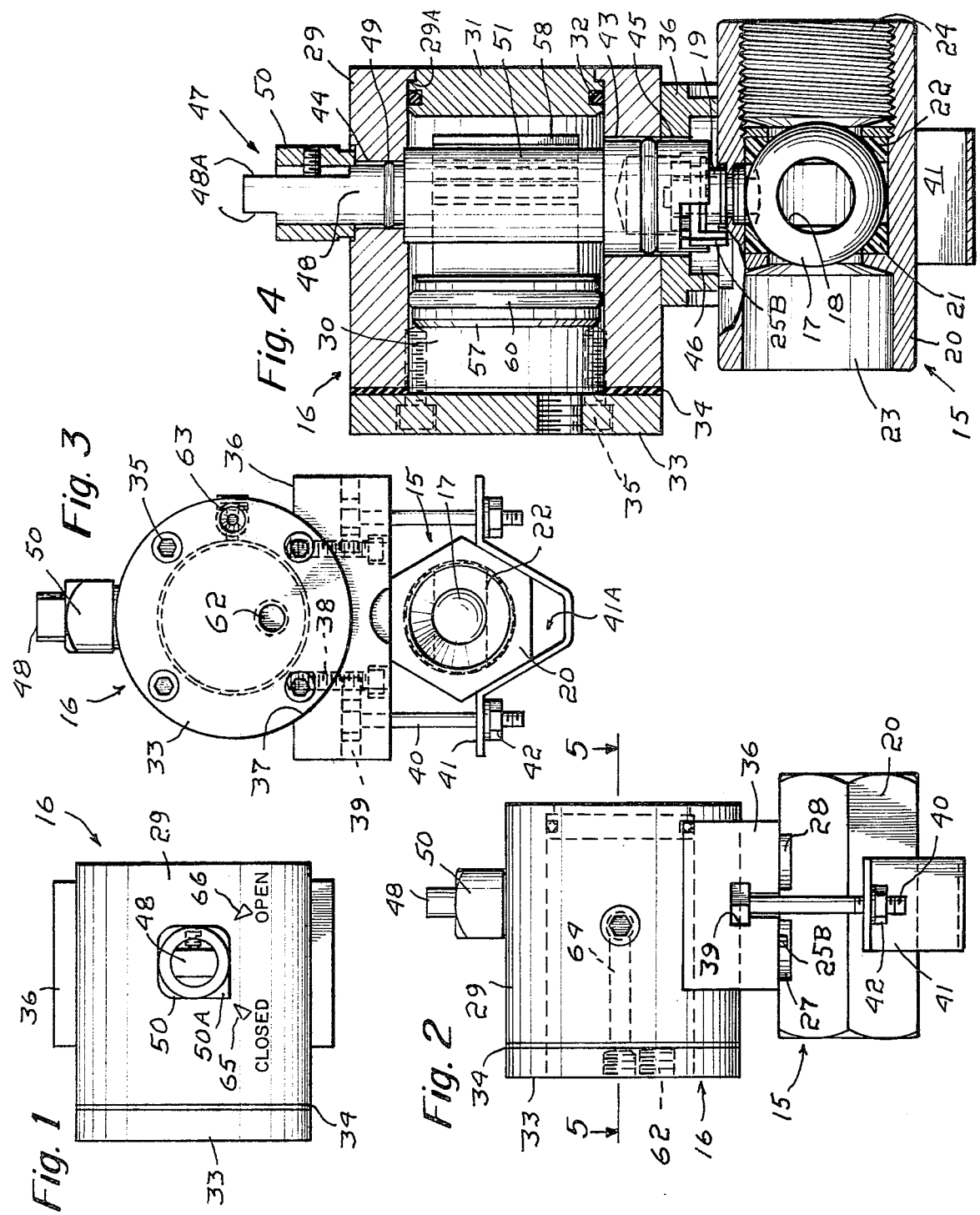

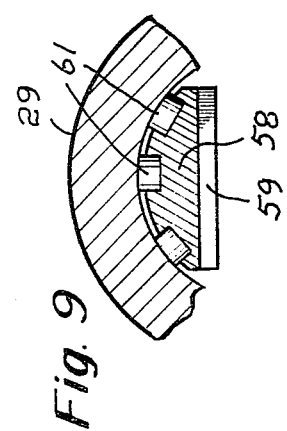
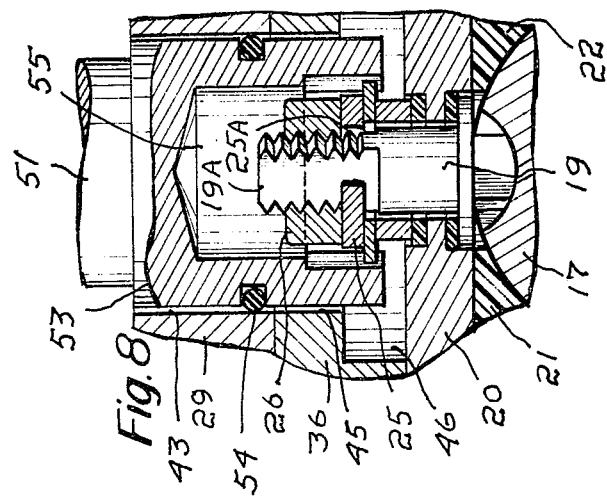
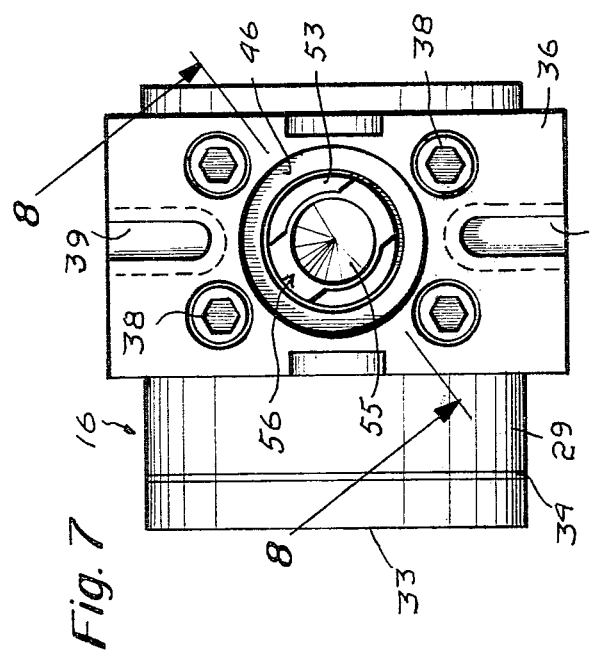
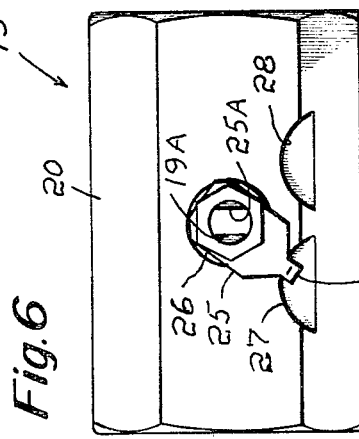
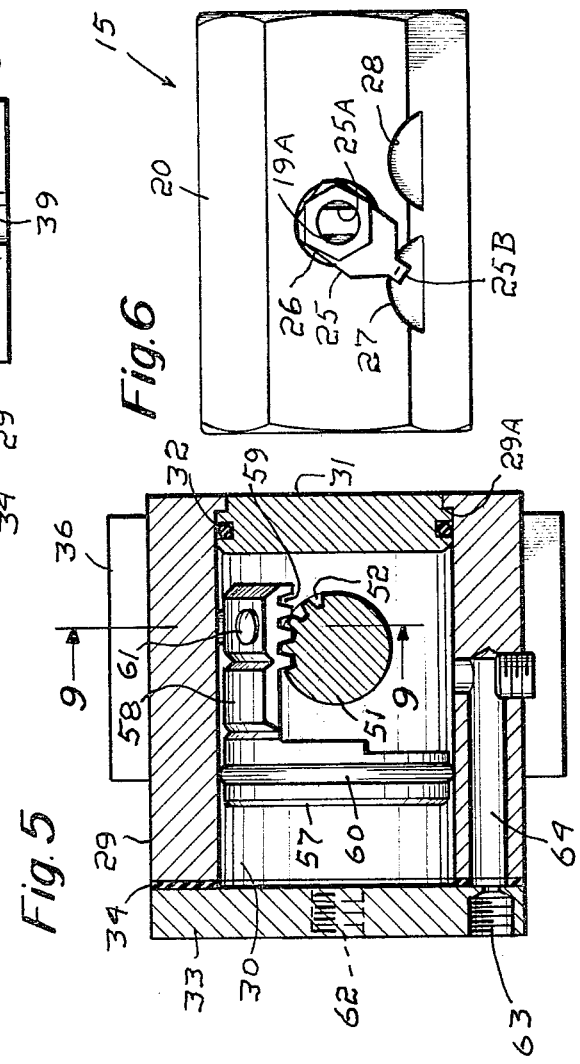

VALVE ACTUATORS AND COMBINED VALVES AND ACTUATORS

BACKGROUND REFERENCES

U.S. Pat. No. 3,650,506
U.S. Pat. No. 3,982,725
U.S. Pat. No. 4,046,350

BACKGROUND OF THE INVENTION

Valve actuators are used to set valves attached thereto in open and closed positions as evidenced by the cited background references.

Such actuators utilize at least one piston reciprocated in a cylindrical chamber by air under pressure, the piston of a type having a segmental skirt provided with transverse teeth which mesh with lengthwise teeth on a rotor extending diametrically through the chamber with an end connected to the stem of a valve when secured to the actuator. Fluid under pressure, usually air, is delivered into and relieved from opposite sides of the piston to reciprocate the piston to set the associated valve in either its open or closed position.

Such actuators are, in general, adapted to meet the requirements but have the common unrecognized objectionable features that when operated to establish one position of the valve, fluid pressure is not only exerted against one face of the piston but also against the substantial area of the chordal face of its skirt with attendant objectionable friction.

THE PRESENT INVENTION

The general objective of the present invention is to provide valve actuators that eliminate the above referred-to objectionable feature and, in addition, provide other advantageous features.

In accordance with the invention, this objective is attained by providing the arcuate faces of the piston skirts with antifriction means, preferably a series of antifriction members such as Teflon or a material having comparable wear and anti-friction characteristics.

Another objective of the invention is to provide that, in the event of loss of operating pressures, the associated valve will be set in a wanted position, usually its closed position. In accordance with the invention, this objective is attained by the use of a series of compression springs within the chamber yieldably urging the piston in a direction to establish the wanted valve position together with means operable to adjust the spring tension in relation to the available fluid pressure.

Yet another objective of the invention is to provide a connection between the valve stem and the rotor of the actuator that cannot loosen, an objective attained by the use of an arm having a slot fitted on the valve stem of a mating cross sectional size and shape and with the rotor formed with a slotted socket to receive and straddle the arm when the valve is secured to the actuator. The valve body desirably has stops appropriately limiting the turning of the stem and desirably the arm is exposed so that the turning of the stem can be visually checked.

BRIEF DESCRIPTION OF THE DRAWINGS

The accompanying drawings illustrate preferred embodiments of the invention of which FIG. 1 is a plan view of the actuator;

FIG. 2 is a side view of an assembled valve and the fluid pressure operated actuator;

FIG. 3 is an end view of the assembly;

FIG. 4 is a section, on an increase in scale, taken lengthwise of the actuator and valve;

FIG. 5 is a section taken approximately along the indicated line 5—5 of FIG. 2;

FIG. 6 is a top plan view of the valve showing its operating arm;

FIG. 7 is a bottom plan view of the actuator showing the arm receiver;

FIG. 8 is a section on a further increase in scale and taken approximately along the indicated line 8—8 of FIG. 7;

FIG. 9 is a fragmentary section also on a further increase in scale taken approximately along the indicated line 9—9 of FIG. 5;

THE PREFERRED EMBODIMENTS OF THE INVENTION

Figure 10:
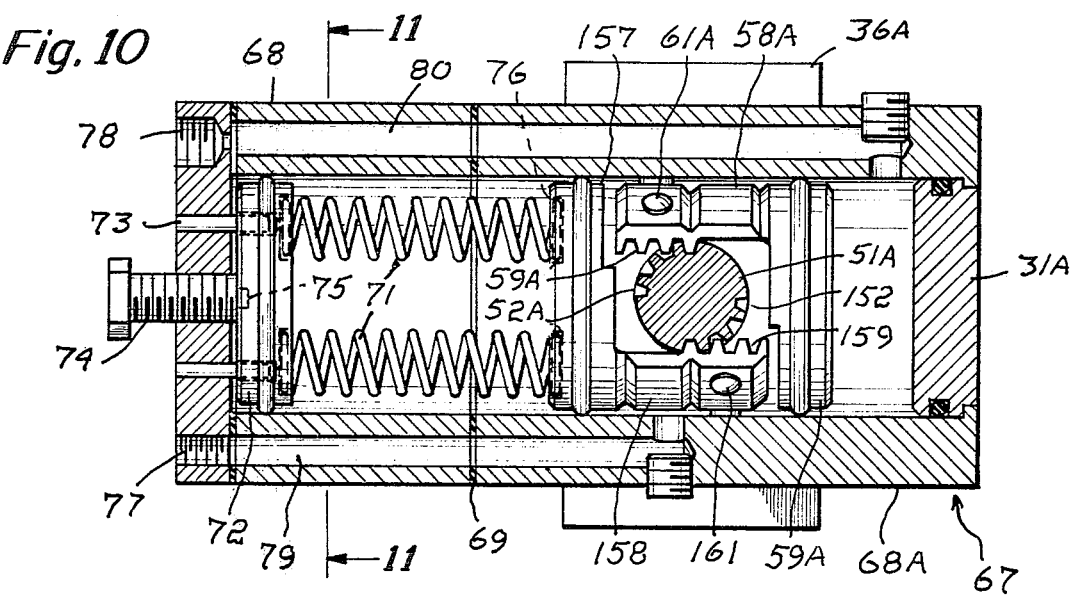
FIG. 10 is a lengthwise section of an actuator in accordance with another embodiment of the invention, the section corresponding to that of FIG. 5.

In the embodiment of the invention illustrated by FIGS. 1-9 the valve and its actuator are generally indicated at 15 and 16, respectively.

The valve 15 is of a type having a ball 17 provided with a transverse bore 18 and a sealed rotatable stem 19 extending outwardly through the valve body 20 which is shown as hexagonal in cross section. The ball 17 may be turned relative to its seats 21 and 22 by the stem 19 90° from its open position in which the bore 18 is in alignment with the aligned ports 23 and 24 into its closed position in which the bore 18 is transversely thereof.

For the purpose of so turning the ball 17 the exposed outer end of the stem 19 is threaded and provided with flat sides 19A, see FIGS. 6 and 8, to enable the slot 25A in a laterally projecting arm 25 to be fitted thereon and held in place by a nut 26. The outer end of the arm 25 has a down-turned end 25A engageable in one position of the ball 17 with a stop seat 27 and in its other position with another stop seat 28, the stops 27 and 28 so spaced as to limit to 90° the extent to which the arm 25 may be turned.

The actuator 16 includes a body 29 formed with a cylinder 30 having a shoulder 29A at one end against which is seated an end wall 31 provided with an O-ring seal 32. The other end of the cylinder is closed by an end cap 33 against a seal 34 and detachably secured to the actuator body by screws 35.

A connector 36 has an arcuate seat 37 against which the actuator body 29 is secured by screws 38. The sides of the connector 36 have T-shaped slots 39 to slidably receive the heads of bolts 40 which extend through the end flanges of a clamp 41 shaped and dimensioned to provide a tapered seat 41A engaging corresponding sides of the valve body 20 when the clamp 41 is secured by properly tightening the nuts 42 on the bolts 40. It will be seen that other valve bodies of similar or other cross sectional shapes and of different cross sectional dimensions can be accommodated by the same clamp and that the slots 39 are of sufficient length to permit the relocation of the bolts 40 for such other valve bodies.

The actuator body 29, see FIGS. 4 and 8, has diametrically aligned bores 43 and 44 with the bore 43 the larger and in registry with a like size bore 45 in the connector 36 which opens into a recess 46. A rotor generally indicated at 47 in FIG. 4 has a shaft end 48 extending outwardly through the bore 44 and carrying a seal 49. A retainer 50 is locked to the outer end of the shaft end 48, the extremity of which has oppositely flattened sides 48A. The rotor 47 also includes a hub 51 dimensioned to pass freely through the bore 43 and span the interior of the cylinder 30 and has a series of teeth 52 best seen in FIG. 5, in practice three in number, extending lengthwise thereof. The rotor 47 includes an end portion 53 dimensioned for entry into the aligned bores 43 and 44 and sealed in the former as at 54 with the end portion 53 provided with a socket 55 dimensioned to freely receive within it the valve stem 19 and nut 26 and slotted to provide a fork 56, see FIG. 7, straddling the arm 25 thus to connect the valve stem 19 to the rotor so that they turn together with the position of the valve ball 17 readily determined. The arm end 25B and the stops 27 and 28 are exposed at one side of the assembled valve and actuator as illustrated by FIG. 2.

A piston 57 within the cylinder 30, see FIGS. 4, 5, and 9, has a skirt 58 that is segmental in cross section, its chordal surface provided with a series of transverse rack teeth 59 engaged with the hub teeth 52 so that the hub 51 functions as a pinion. The piston 57 is provided with a sealingg ring 60 while the skirt 58 is provided with a plurality of circumferential spaced anti-friction means in the form of buttons 61 of Teflon or the equivalent.

The actuator 16 is to be operated by air under pressure and its body 29 has ports 62 and 63, the former in the end cap 33 and opening directly into the cylinder 30 on one side of the piston 57, and the latter opening through the end cap 33 and in communication with a bore 64 in the wall of the actuator body which opens into the cylinder 30 on the other side of the piston 57 and opposite the chordal face of the skirt 58 with the buttons 61 preventing the resulting pressure on the skirt 58 from otherwise introducing an undesirable amount of friction.

It will be appreciated that the air supply for the actuator 16 includes a conventional three-way valve, not shown, such that air under pressure may be delivered into the cylinder 30 via either port and simultaneously be vented therefrom via the other port thus to effect the turning of the valve 17 from one position to the other. In practice the retainer 50 is formed to establish a pointer 50A and the cylinder is provided with markers 65 and 66 visually showing the status of the valve 15 when the actuator is viewed from above.

Figure 11:
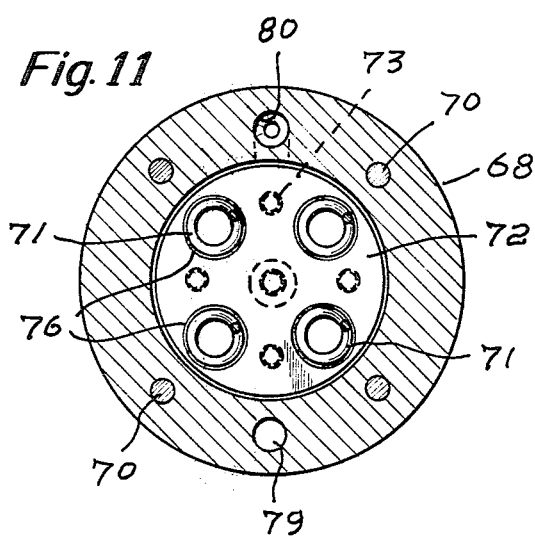
FIG. 11 is a section taken approximately along the indicated line 11—11 of FIG. 10.

As the embodiment of the actuator generally indicated at 68 in FIGS. 10 and 11 is or may be connected to a valve such as the valve 15 but typically larger in the same manner as in the case of the actuator 16, such a valve is not shown and the connector is not again described. Parts of the actuator 67 corresponding to those of the actuator 16 are identified by the appropriate reference numerals distinguished, however, by the suffix addition A.

The body of the actuator 67 is substantially longer than the body 29 and is shown as consisting of two sections 68 and 68A, an intermediate gasket 69 and clamped together by screws 70. The rotor of the actuator 67 is or may be the same as the rotor 47 except that its hub 51A has, in addition to the series of teeth 52A in mesh with the skirt teeth 59A of the piston 57A, a like, diametrically opposed series of teeth 152 in mesh with the rack teeth 159 with which the skirt 158 of a second piston 157 is provided.

The pistons 57A and 157A are identical but reversed and so disposed that the rack teeth of each engage the appropriate series of pinion teeth of the rotor hub 51A. When the two pistons are forced apart, the associated valve is placed in a first position, usually its open position and when they are forced back into their first position, the valve is returned to its second or closed position. Both skirt portions are provided with anti-friction buttons 61A and 161.

It will be noted that the distance between the hub 51A and the end cap 33A is substantially greater than the distance between the rotor 47A and the end wall 31A. A series of compression springs 71, in practice four in number, extend lengthwise of the longer portion of the cylinder 30A and bear against the piston 157. The springs 71 are not backed by the end plate 33A but by a backing member 72 slidably sealed in the cylinder 30A and held on guide pins 73 carried by the end cap 33A. A screw 74 is threaded through the center of the end cap 33A and has an unthreaded tip 75 entrant of an axial seat in the backing member 72. Both the backing member 72 and the piston 157 have seats 76 for the ends of the springs 71.

The end cap 33A and the seal 34A have two ports 77 and 78, the former in registry with a bore 79 extending lengthwise of the body of the actuator 67 and opening into the cylinder 30A between the two pistons in their first position and the latter in registry with a bore 80 extending through the actuator body and opening into the cylinder 30A close to the end wall 31A. Thus, when air is admitted into the cylinder through the port 77 to force the pistons apart against the opposition of the springs 71, air is vented via the bore 80 and it will be noted that the seal 34A is cut away as at 81 to permit the venting of air from the space between the backing member 72 and the end plate 33A.

When air is admitted into the cylinder 30A via the port 78 and the bore 80, the pistons are returned to their first position with air vented via the bore 79. The function of the springs 71 is to ensure the return of the valve to its "safe" position in the event that the air source fails. As the operating pressure may vary, the resistance of the springs 71 may be appropriately varied by means of the adjusting screws 74.

I claim:

1. An actuator for a valve having an exposed stem, said actuator including a body having a cylindrical chamber, a rotor extending diametrically through said chamber and spaced from the ends thereof, said rotor including a lengthwise series of teeth within said chamber, at least one piston within said chamber, said piston provided with a sealing ring and including an integral skirt with inner and outer segmental portions, the chordal face of said outer skirt portion being provided with a series of transverse teeth meshing with said rotor teeth and the opposite surface of said skirt including a plurality of circumferential spaced sockets adjacent and spaced in said outer skirt portion, a plurality of anti-friction buttons being press-fitted in each of said sockets, said buttons being solely positioned along the centerline of said transverse teeth, and the maximum cross-sectional area of said buttons being less than the length of said transverse teeth, and said body including two passageways, each for use in the delivery or relief of air, both passageways opening through the same end of the body, one passageway in communication with said chamber on the side of said one piston opposite said skirt and the other in communication with said chamber on the other side of said one piston, and means operable to clamp said valve to said actuator, one end of said rotor exposed and provided with means extending into said clamping means then operable to so grip said stem that said stem turns with said rotor, one passageway for use in effecting the turning of the rotor in a valve opening direction and the other passageway for use in effecting the turning of the rotor in a valve closing direction.

2. The actuator of claim 1 in which the valve clamping means includes a clamp having a V-shaped seat dimensioned to accommodate valve bodies the cross sectional dimensions of which are within a predetermined range, said clamp including end flanges, a connector having a flat backing surface attached to said body transversely thereof and having a bore freely receiving said one end of the rotor, said connector having aligned T-shaped slots opening through its ends and backing surface, a bolt slidably held in each slot and extending through the appropriate end flange, and nuts threaded on said bolts whereby a valve when positioned in said seat may be clamped against the backing surface, the length of said slots such that they may be spaced apart as required by the dimensions of the valve.

3. The actuator of claim 1 in which the rotor has a diametrically opposed second series of teeth, a second identical piston is within the chamber on the side of the rotor opposite said one piston and with the teeth of its skirt in mesh with the second series of rotor teeth, and spring means in said chamber on one side of the piston and in engagement therewith, a member backing said spring means and provided with a sealing ring and in said chamber slidably connected to the proximate end of the chamber, and a member adjustably threaded through said proximate end wall backing said backing member and adjustable to vary the tension of the spring means in relation to the air pressure available for the operation of the actuator thereby to be adequate to actuate the pistons in the event of loss of air pressure and to yield to the air pressure while available.

4. The actuator of claim 3 in which the spring means includes a set of spaced parallel springs.

5. In combination, a valve including a stem extending outwardly of the valve body, an arm secured to the stem, and said body provided with a pair of spaced stops limiting the turning of the stem to predetermined opened and closed positions, and an actuator including a body having a cylindrical chamber, a rotor extending diametrically through said chamber and spaced from the ends thereof, said rotor including a lengthwise series of teeth within said chamber, at least one piston within said chamber, said piston provided with a sealing ring and including an integral skirt with inner and outer segmental portions, the chordal face of said outer skirt portion being provided with a series of transverse teeth meshing with said rotor teeth and the opposite surface of said skirt including a plurality of circumferential spaced sockets adjacent and spaced in said outer skirt portion, a plurality of anti-friction buttons being press-fitted in each of said sockets, said buttons being solely positioned along the centerline of said transverse teeth, and the macimum cross-sectional area of said buttons being less than the length of said transverse teeth, and said body including two passageways, each for use in the delivery or relief of air, both passageways opening through the same end of the body, one passageway in communication with said chamber on the side of said one piston opposite said skirt and the other in communication with said chamber on the other side of said one piston and the chordal face of the skirt, and means operable to clamp said valve to said actuator with said stops and arm exposed, one end of said rotor exposed in the form of a fork gripping said arm so that one passageway is for use in effecting the turning of the rotor in a valve opening direction and the other passageway for use in turning the rotor in a valve closing direction.

* * * * *